March 18, 1941.   P. B. KELLY   2,235,215
LOGGING YARDER
Filed March 23, 1940   2 Sheets-Sheet 1
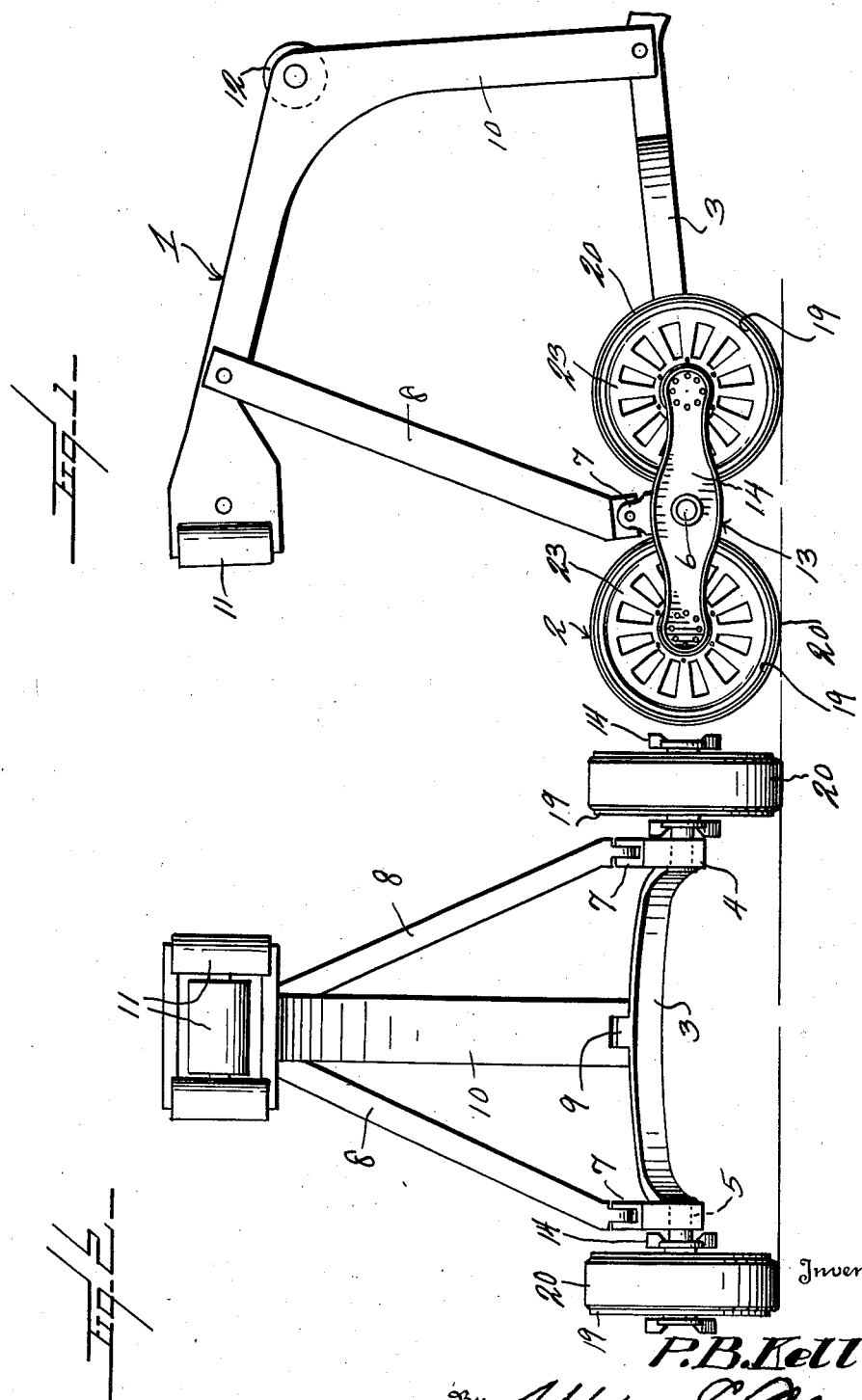
Inventor
P. B. Kelly
By Watson E. Coleman
Attorney March 18, 1941. P. B. KELLY 2,235,215
LOGGING YARDER
Filed March 23, 1940 2 Sheets-Sheet 2
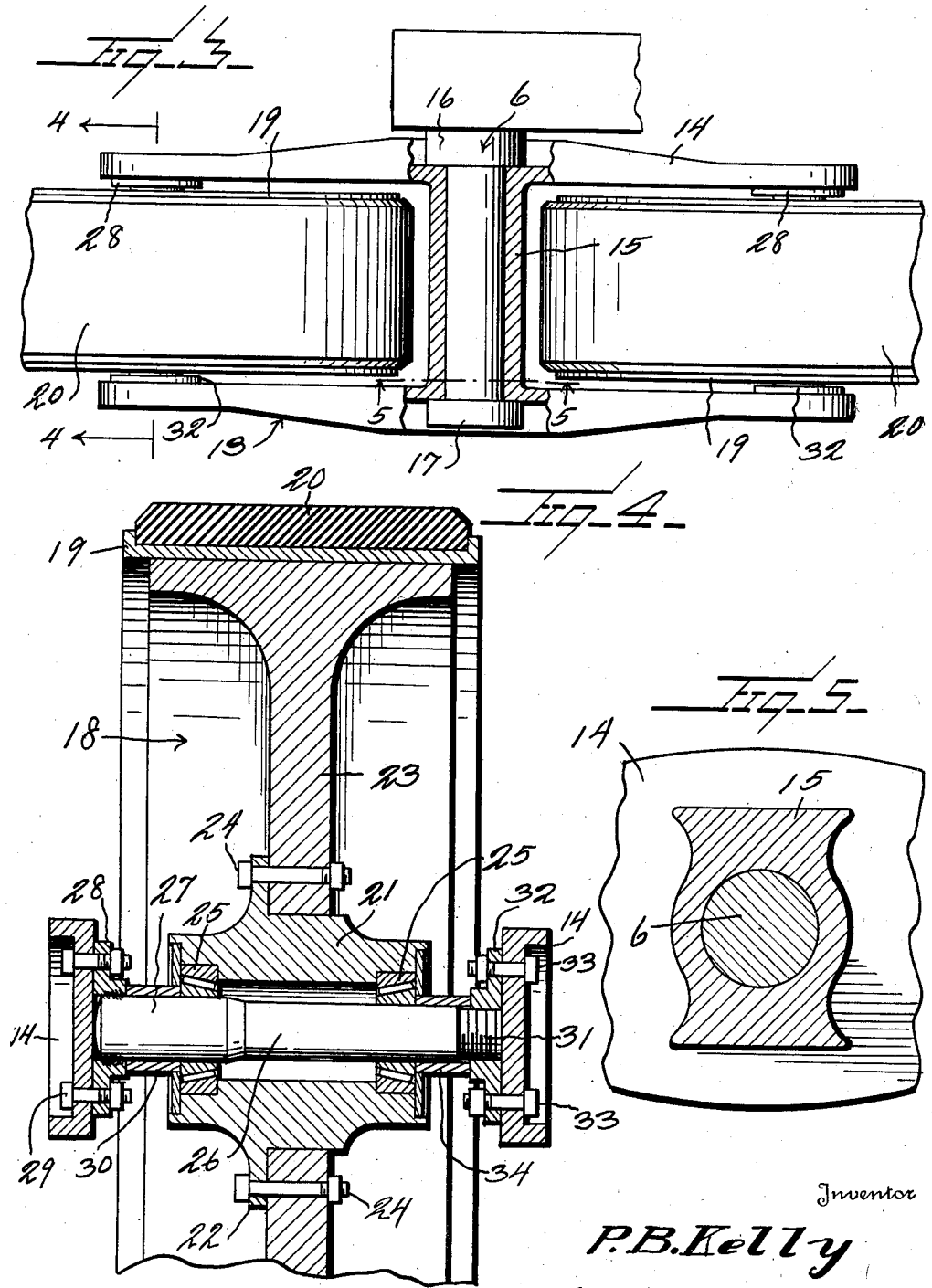
Inventor
P. B. Kelly
By Watson E. Coleman
Attorney Patented Mar. 18, 1941

2,235,215

UNITED STATES PATENT OFFICE 2,235,215

LOGGING YARDER

Paul B. Kelly, Prineville, Oreg.

Application March 23, 1940, Serial No. 325,623

5 Claims. (Cl. 280—81)

This invention relates to the class of land vehicles and pertains particularly to improvements in yarders or vehicles employed for skidding logs.

The primary object of the present invention is to provide an improved wheel construction for log skidding vehicles or yarders wherein such wheels, employed in sets of two at the sides of the structure, are designed for support upon a reversible set of walking beams so that the passage of the wheel units over the ground is facilitated where the ground area is cluttered with logs, stumps or other objects over which ordinary wheel units would have difficulty in passing.

Another and more specific object of the invention is to provide in a log skidding device, improved sets of supporting wheels which are coupled together and coupled with the arch structure with which the logs are connected, in such manner that should a wheel strike an object which it cannot readily roll over, the trailing wheel will rise up and step over the object so that the progress of the machine will not be interfered with and the former leading wheel will then become the trailing wheel and may be readily drawn over the obstructing object.

A still further object of the invention is to provide in a structure of the character stated having dual supporting wheels at each side, novel means of coupling such dual wheels together and of mounting the wheels upon the said coupling means whereby a rigid construction is obtained.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings—

Fig. 1 is a view in side elevation of a log skid or yarder showing a pair of wheels connected therewith and constructed in accordance with the present invention.

Fig. 2 is a view in rear elevation of the structure.

Fig. 3 is a view in top plan of a pair of wheels with a portion of the connecting frame therebetween in horizontal section.

Fig. 4 is a sectional view on the line 4—4 of Fig. 3.

Fig. 5 is a view in transverse section of the wheel frame hub and axle, the section being substantially on the line 5—5 of Fig. 3.

Referring now more particularly to the drawings, there is illustrated in Figs. 1 and 2, a yarder or log skid frame, which is designated generally by the numeral 1, of standard construction, which frame is supported upon dual wheel units indicated generally by the numeral 2 and connected therewith and constructed in accordance with the present invention. The frame structure 1 comprises a substantially horizontally disposed arch frame 3 having the rearwardly extending substantially parallel side members 4, each of which is provided with a transverse bearing 5 for the reception of an end of a stub axle 6. Upon the top of each of the side portions 4 of the frame 3 is a bearing 7, with which the lower end of an upwardly and forwardly extending brace beam 8 is pivotally connected. The forward central part of the frame 3 is constructed in a suitable manner, not shown, to facilitate its connection with a draft machine, and such forward end is also provided with a neck 9, with which is connected the lower end of an upwardly and rearwardly extending arch 10, which at its rear end carries the usual guide rollers 11 across which pass cables which are hitched to logs to be shifted, such cables passing forwardly over a guide roller 12 carried by the arch 10 and to a suitable take-up means upon the draft structure, not shown.

In accordance with the present invention, each of the wheel units 2 comprises a frame indicated generally by the numeral 13, which consists of two spaced parallel beams 14 connected together at their transverse centers by the hub 15, which is cast integrally with the beams, as shown in Fig. 3. This hub receives the outer end of the stub axle 6, the axle carrying the inner and outer collars 16 and 17, respectively, between which the ends of the hub are secured, so that the wheel frame may turn on the stub axle as may be necessary.

Upon each side of the frame hub 15 there is disposed between the adjacent ends of the frame beams 14, a wheel indicated generally by the numeral 18 and having a very wide felly 19 covered by or encircled by a tread or tire 20 of solid rubber. The wheels are of the conventional steel spoke type and each has a central removable hub 21, as shown in Fig. 4, these hubs being provided with surrounding flanges 22, which bear against a side of the steel center or web portion 23 of the wheel, which is formed to provide integral spokes, and being bolted thereto, as indicated at 24.

In each end of each wheel hub 21, a bearing unit 25 is located which is preferably of the conventional roller type and through these bearing units and the supporting hub, there extends a spindle 26.

Each spindle 26 has a portion of one end of slightly enlarged diameter, as indicated at 27, and this enlarged end is welded in a collar 28 which is disposed against the inner side of a beam 14 adjacent the end thereof and secured thereto by bolts 29. Between the collar 28 and the adjacent bearing 25 is a spacer sleeve 30 which encircles the spindle and maintains the adjacent side of the wheel the proper distance from the adjacent collar and beam.

The opposite or smaller end of each spindle 26 is screw threaded, as indicated at 31, and this threaded end has threaded thereon a collar 32, which positions against the inner side of the opposite beam and is secured to that beam by bolts 33, this collar 32 being spaced from the adjacent bearing 25 by the spacing sleeve 34. By means of the threaded collar 32 and the spacing sleeves 30—34, which encircle the two ends of the spindle, the proper adjustment of the bearings is obtained and the wheel is properly centered between the two ends of the beams 14. When the wheels are mounted between the beams 14, the collar 28 would first be secured to its beam and the proper adjustment of the wheel and of the bearings then made by the application of the threaded collar 32 to the other end of the spindle. When this threaded collar is then securely bolted to the said other beam, there will be obtained a rigid connection which strengthens the beams and prevents springing.

As will be readily seen, the center construction or hub 15 between the beams is designed, as shown in Fig. 5, to make the beams rigid while at the same time adding as little weight as possible to the construction, and also this center construction is so designed as to prevent obstacles clogging the wheels.

The design and construction of the dual wheel unit frames is such as to enable the wheels to follow a very rough contour of the ground. Any one of the wheels can go up or down independently of the others, thus enabling them to go into and out of depressions or over stumps, rocks or the like. If one of the front wheels comes up against an object over which it cannot readily pass, the rear wheel, because of the design of the unit, will rise up and swing over the front wheel, the frame 13 turning on the axle 6. In this manner, the rear wheel will pass the front wheel and then become or take the place of the front wheel which then, as the trailing wheel, will be readily drawn over the obstructing object.

What is claimed is:

1. In a logging apparatus including an arch frame, a stub axle secured to each side of and projecting laterally from the frame, a dual wheel unit rotatably supported upon each stub axle, each unit comprising an elongated frame consisting of two spaced parallel beams and a hub cast integrally with the beams at the transverse centers thereof to receive the axle, a wheel disposed between each two adjacent ends of the pair of beams, each wheel including a bearing carrying hub, a spindle passing through said hub and the bearings carried thereby, a collar fixed upon one end of the spindle, a collar detachably connected with the other end of the spindle, and means securing said collars each against the inner face of the adjacent beam whereby the adjacent pair of beam ends is rigidly coupled together through the spindle.

2. In a logging apparatus including an arch frame, a stub axle secured to each side of and projecting laterally from the frame, a dual wheel unit rotatably supported upon each stub axle, each unit comprising an elongated frame consisting of two spaced parallel beams and a hub cast integrally with the beams at the transverse centers thereof to receive the axle, a wheel disposed between each two adjacent ends of the pair of beams, a hub carried by each wheel, a pair of bearing units in the hub, a spindle passing through each pair of bearing units, a collar secured to one end of said spindle, the opposite end of the spindle being threaded, a collar threaded upon the said opposite end of the spindle, spacing sleeves encircling the spindle and separating said collars from the adjacent bearings, said collars being apertured and disposed against the inner sides of the adjacent beams, and securing elements passing through the apertures of the collars and through corresponding apertures in the beams to rigidly couple the collars with the beams and rigidly couple the beams together through the spindle.

3. A wheel supporting means, comprising a pair of supporting bodies having spaced opposed faces, a wheel spindle of a length to be interposed between said faces, means forming an integral part of the spindle at one end for securing the said one end of the spindle to the inner face of the adjacent body, means removably coupled with the other end of the spindle for detachably coupling the said other end to the inner face of the supporting body adjacent thereto, and means for rotatably supporting a wheel upon the spindle, the said means for coupling the ends of the spindle to the opposed faces being shiftable across said faces when detached from the supporting bodies.

4. A wheel supporting means of the character described, comprising a pair of supporting members having spaced opposed faces, a collar detachably secured against one of said faces, a spindle having an end removably secured in said collar and adapted to extend transversely between the supporting members and between the opposing faces, means integral with the other end of the spindle forming a securing flange which is detachably coupled with and against the other face, and means for rotatably supporting a wheel on the spindle.

5. A wheel supporting means, comprising a pair of supporting members having spaced opposed faces, a spindle interposed between said faces and perpendicular thereto and having a length substantially equal to the distance between the faces, means forming an integral part of the spindle at one end for detachably securing the said one end of the spindle to the adjacent face, said spindle at its other end being screw threaded, a collar connected with the said other end of the spindle by the screw threads thereon, means for securing said collar against the other face, a wheel having rotatable support upon the spindle, and spacing sleeves encircling the spindle upon both sides of the wheel, one of which sleeves engages said collar and the other sleeve engaging the said means integral with one end of the spindle.

PAUL B. KELLY.